No. 754,457. PATENTED MAR. 15, 1904.
I. KITSEE.
TELEPHONIC RELAY OR REPEATER.
APPLICATION FILED JULY 7, 1899. RENEWED APR. 25, 1902.
NO MODEL.
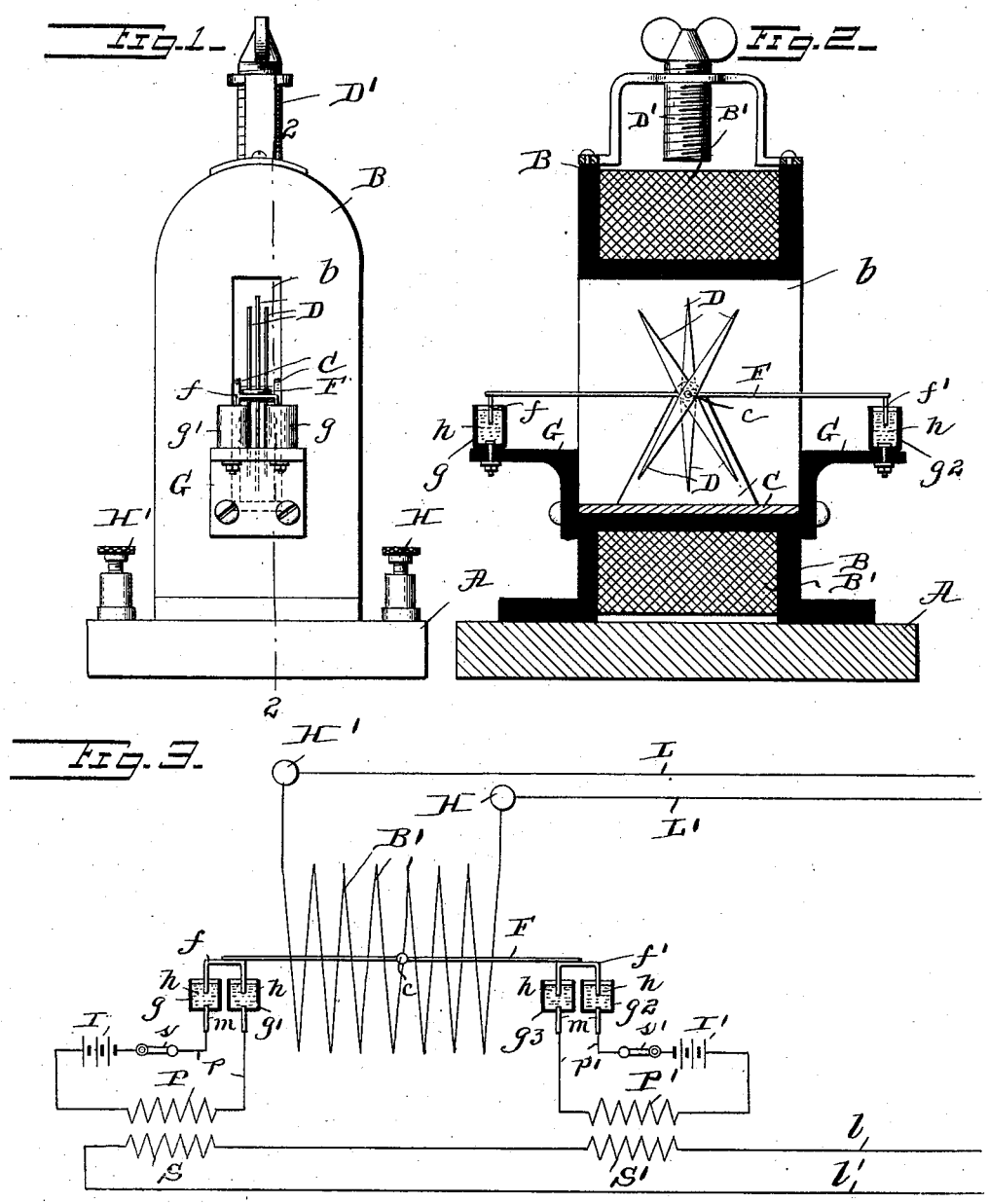
Witnesses. 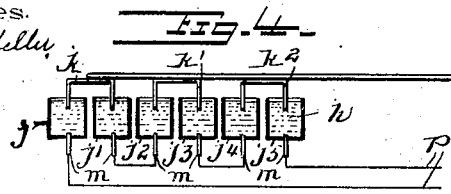 Inventor.

No. 754,457.

Patented March 15, 1904.

UNITED STATES PATENT OFFICE.

ISIDOR KITSEE, OF PHILADELPHIA, PENNSYLVANIA.

TELEPHONIC RELAY OR REPEATER.

SPECIFICATION forming part of Letters Patent No. 754,457, dated March 15, 1904.

Application filed July 7, 1899. Renewed April 25, 1902. Serial No. 104,677. (No model.)

*To all whom it may concern:*

Be it known that I, ISIDOR KITSEE, of the city and county of Philadelphia, State of Pennsylvania, have invented certain new and useful Improvements in Telephonic Relays or Repeaters, of which the following is a specification.

My invention relates to an improvement in telephonic relays or repeaters.

The object of my invention is to produce a telephonic instrument capable of automatically transferring the messages transmitted through one telephonic circuit to a second and independent circuit and with the aid of said circuit transmitting the same to a point or points more or less remote from the repeating-station.

Broadly speaking, the underlying principle of this my invention consists in the employment of a galvanometer the needle or needles of which are adapted to vary the resistance of a local circuit through their varying position due to the incoming telephonic current and through the variation of this local circuit to produce impulses in a second telephonic circuit.

Referring to the accompanying drawings, Figure 1 is an end view of my improved telephonic relay or repeater. Fig. 2 is a section on the line 2 2 of Fig. 1. Fig. 3 is a diagram showing the electrical connections of the device as well as the incoming and outgoing line-wires. Fig. 4 is a diagram showing the arm carrying three yokes or sets of contact-points, as well as the cups for the same, in order to increase the variation of the resistance in the primary circuit.

A is the base; B, the insulating core or skeleton of the solenoid or helix. B is the orifice in said core or skeleton.

C is a bearing or bracket in the orifice $b$.

$c$ is a spindle or shaft on which are mounted the needles D, as well as contact-arm F, said arm carrying the contact yokes or points $f f'$ at its ends.

G represents brackets secured to the core B. Mounted on the end of each of these brackets G are the cups $g\ g'\ g^2\ g^3$. The points of the yokes $f$ enter the cups $g\ g'$. The points of the yokes $f'$ enter the cups $g^2$ and $g^3$ for the purpose hereinafter to be described.

$h$ is the liquid or michrophonic material contained in each of these cups.

D' is the adjustable permanent magnet to hold the needles in the desired position.

H H' are the binding-posts for the terminals of the coil B'.

Referring now to Fig. 3, L L' are the incoming line-wires. $l\ l'$ are the outgoing line-wires. I I' are the batteries in the primary circuits $p\ p'$. $s\ s'$ are switches in said circuits. P P' are the primary coils in said circuits. $m\ m$ are the contact-points in the cups $g\ g'\ g^2\ g^3$. S S' are the secondary coils in the outgoing line-wires.

Referring now to Fig. 4, F is the arm carrying the contact points or yokes $k\ k'\ k^2$. $j\ j''\ j^2\ j^3\ j^4\ j^5$ are the cups containing the liquid or michrophonic material $h$. These cups are connected in series in the primary circuit $p$.

It can readily be understood by referring to Figs. 1 and 2 that by removing either of the brackets G the bearing C, with all its appurtenances, can be drawn out of the orifice $b$.

It is necessary to remark that if the cups are loosely packed with powdered carbon the resistance through the vibration of the contact-arm is easily varied; but experiments have proven that in time the carbon has a tendency to pack, and the resistance to the downward movement of the point is somewhat greater than with the employment of a liquid. Diluted sulfuric acid would be the ideal michrophonic material were it not for the electrolytic effect of the current. This necessitates that all exposed parts of the instrument should be covered with a moistproof varnish. This also necessitates the occasional adding of new liquid for the one evaporated or electrolyted. The use of mercury cannot well be recommended, for the reason that it offers too much resistance to the contact-points if the same are immersed in the mercury; but where it is preferred that the contact-points should themselves be of a michrophonic material the difference of pressure of these points on the mercury may in some cases be sufficient. The relation of the cups to the points can also be so regulated that the incoming circuit makes and breaks the electric contact; but I have found that very little reliance can be placed on this method.

I will first describe the galvanometer proper and point out the reason for the employment of the three needles at angles to each other. Years ago I had occasion to make a galvanometer pure and simple, and in my endeavor to produce an instrument capable of indicating the slightest resistance of a circuit attached to it I experimented with different arrangements of the needle. It is unnecessary to give here all the experiments in detail, and for the purpose of this my invention it is sufficient to state that the arrangement of the three needles, as illustrated in the drawings, at an angle of about fifteen degrees to each other proved the most satisfactory, and I therefore adopted this arrangement for this purpose. The needles themselves may be magnetically insulated from each other—that is, they should present three separate needles at three different angles to the coil. The magnetic insulation is not a necessity, only that it makes the instrument more sensitive to the incoming current. I prefer to keep the needles in a bias or strained position with the aid of an adjustable magnet D', for the reason that the minutest flow of current will alter the influence of this magnet, and therefore will allow the needles to alter their position. I have placed the three needles on one shaft, which to make the movement more sensitive I have suspended with the aid of jewels on the frame capable of being inserted in the coil or taken out of same. This arrangement is employed in preference to those arrangements wherein the needles are permanently fixed to the skeleton of the coil. To the needles and at right angles to the points of the same is secured what I call the "contact-arm." This contact-arm may be made out of any conducting or non-conducting material, the latter to be preferred, for the reason that I employ the downward movement of the arm to vary a local circuit separate from the local circuit to be varied by the upward movement of the arm. Each end of this arm should be provided with at least two points electrically connected together. As to the arrangements of the circuits, the one to be relayed, as well as the circuit with the aid of which the relayed messages should be transmitted, the arrangement is as follows: The terminals of the coil of the galvanometer or instrument alike in its action are connected to the terminals of the incoming circuit. The local circuit with the aid of which the incoming message is to be repeated is provided with contact-points or, as illustrated in the drawings, with contact-cups. These cups are placed in juxtaposition to the contact-points secured to the contact-arm of the movable needles. The local circuit is also provided with a source of current—such, for instance, as voltaic or secondary cells and the primary of an inductorium. It is desirable to provide this circuit with a switch or other suitable arrangement, so as to be able to open and close the same at will. The secondary of an inductorium of the local circuit is connected to the terminals of a second and independent circuit provided at the other terminals either with telephonic receivers or with a duplicate instrument, as described herein, so as to again repeat the once-repeated message. The contact-cups may be filled with mercury, or they may be filled with finely-divided carbon or any other suitable substance; but I prefer to use in the cups diluted sulfuric acid, as this fluid offers the greatest resistance to the varying movements of the contact-points. The cups themselves should be of a non-conducting material and only the lower part of the cups be provided with a conducting-point connected to the binding-posts to which the terminals of the local circuit are connected.

The *modus operandi* in carrying out my invention is as follows: The needles are placed inside of the coil and their position adjusted with the aid of the large magnet outside of the coil. The cups are filled with the diluted acid and then placed in such a position that the contact-points normally dip into the liquid. The incoming circuit is then connected to the terminals of the coil. The local circuit containing the battery and primary of an inductorium is connected to the binding-posts of the containing cups. The outgoing circuit is connected to the secondary of the inductorium. If now a telephonic message is sent from the line-wire of the incoming circuit, the electric impulses flowing through the coil-circuit will influence the needles inside of the coil in a manner so that they will move to and fro in harmony with the direction of the current impulses. Through the variation of the position of the needle, and therefore position of the contact arm and points, the distance between these points and the contact-points connected to the local circuit will be varied and through this variation secondary impulses will be set up in the secondary coil of the inductorium. To make use of the upward movement as well as the downward movement of the contact-arm, I have provided, as said before, both ends with contact-points in proximity to contact-cups, of which at least each pair of said contact-cups is connected to an independent local circuit, the secondaries of these local circuits being connected in a manner so that the at one and the same time generated secondary impulses will always flow in the same direction as to each other and will therefore increase.

If it is desired, each end of the contact-arm can be provided with two or more sets of contact-points. All of these sets can be either part of one and the same circuit or each set can be part of a separate circuit. It is understood that each point has to be provided with a contact-cup. I did not deem it necessary to illustrate in the drawings a telephonic receiver to be attached to the incoming or outgoing circuit, as it is well understood that such may be done without interfering with the working of my device. The resistance of the coil has to vary in accordance with the resistance of the circuit to be relayed; but I had very good results with coils of five hundred ohms resistance, consisting of silk-covered wire No. 32, the relayed circuit being equal to two hundred and fifty miles of usual circuit-wire. It is also understood that the mechanically-made arrangement may differ or that the arrangement of the needles or other parts may vary without departing from the scope of my invention.

Having now described my invention, what I claim as new, and desire to secure by Letters Patent, is—

1. A telephonic relay consisting essentially of a galvanometer, the needle or needles of which are provided with means to vary the resistance of a local circuit through the action of the incoming current; said local circuit containing the primary of an inductorium the secondary of which is adapted to be connected to a second line-wire, the coil of said galvanometer adapted to be connected to the primary telephonic circuit, and the needle or needles placed in the recess of said coil.

2. A telephonic relay, consisting essentially of a galvanometer consisting of a stationary helix and movable needle or needles placed in the recess thereof, the helix of said galvanometer is electrically connected to a telephonic circuit, and the movable needle or needles of which are provided with a contact-arm, the contact-points of which are in electrical connection with a local circuit containing a generator of electricity and the primary of an inductorium, the secondary of which is adapted to be connected to a second line-wire.

3. A telephonic relay, consisting essentially of a galvanometer consisting of a stationary coil and needle or needles placed in the recess thereof, the needle or needles of said galvanometer provided with a contact-arm, the contact-points of said contact-arm being conducting, and adapted to increase or decrease the resistance of a local circuit containing a battery and the primary of an inductorium, the secondary of which is adapted to be connected to a second line-wire.

4. A telephonic relay, consisting essentially of a galvanometer, the movable needles of which are provided with means to vary the resistance of two independent local circuits, each of said circuits containing a generator of electricity, and a primary of an inductorium, the secondaries of said primaries being in electrical contact with each other, and adapted to be connected to a second telephonic circuit.

In testimony whereof I sign my name this 6th day of July, A. D. 1899.

ISIDOR KITSEE.

Witnesses:
 E. R. STILLEY,
 WALLACE B. ELDRIDGE.